May 14, 1968  F. H. ANDERSON ET AL  3,383,639
CORD EXTENSION COUPLING CLAMPS
Filed April 6, 1966
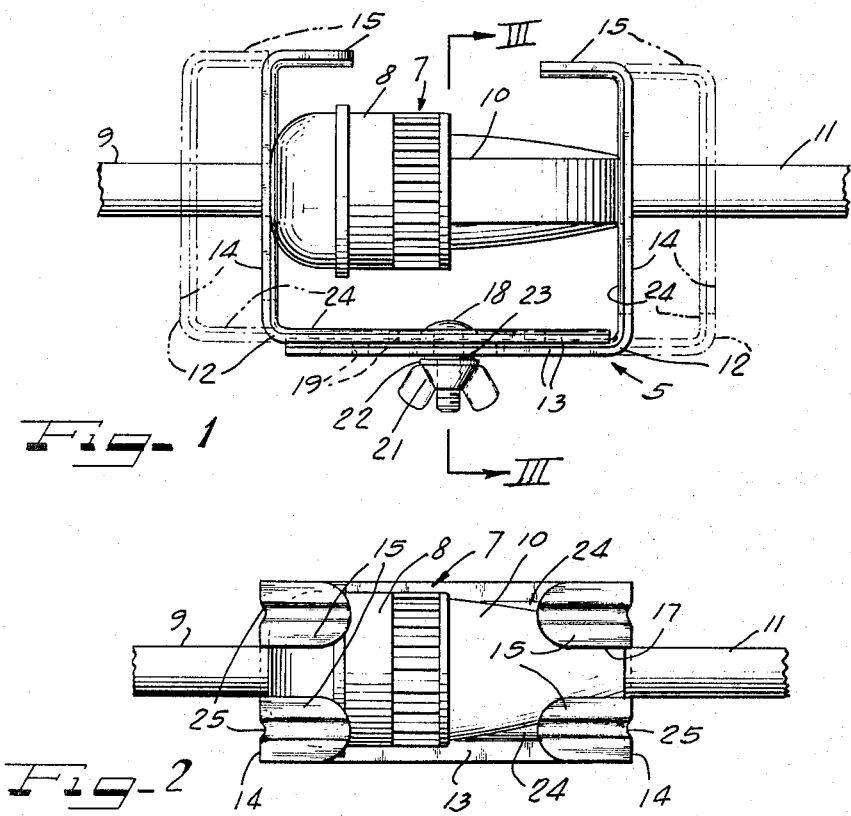
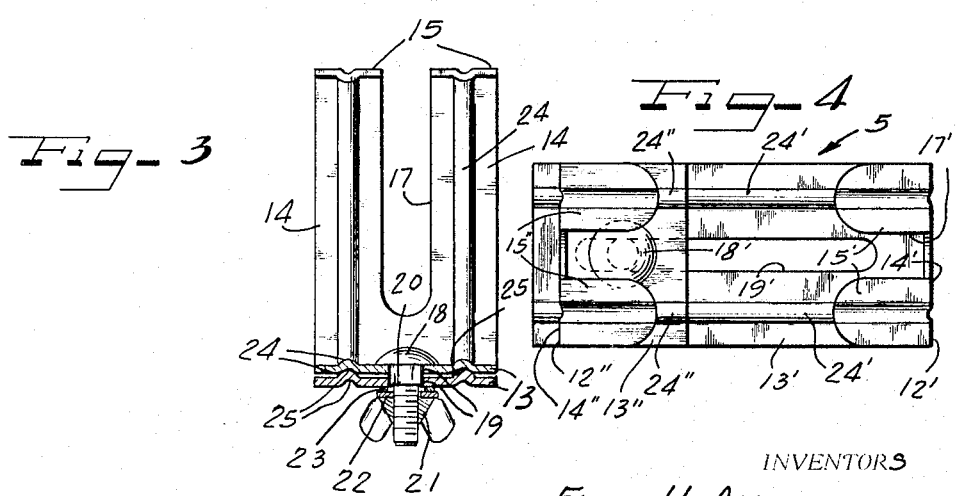
INVENTORS
FRED H. ANDERSON
FRED H. ANDERSON JR.
BY Hill, Sherman, Meroni, Gross & Simpson ATTORNEYS United States Patent Office 3,383,639
Patented May 14, 1968

3,383,639
CORD EXTENSION COUPLING CLAMPS
Fred H. Anderson, 622 W. Aldine 60657, and Fred H. Anderson, Jr., 2540 N. Halsted St. 60614, both of Chicago, Ill.
Filed Apr. 6, 1966, Ser. No. 540,732
5 Claims. (Cl. 339—75)

ABSTRACT OF THE DISCLOSURE

A cord extension coupling clamp has a pair of complementary clamp members of sheet material each of which has a base flange from one end of which extends angularly a clamping flange having a terminal retainer flange projecting angularly into overlying spaced relation to the base flange. Each of the clamping flanges and its retainer terminal flange is divided by a longitudinally extending medial open ended cord-clearing slot into a pair of fingers. Longitudinally extending reinforcing ribs in the base flanges and the fingers are internested in the base flanges and a clamping screw retains the clamp members in longitudinally slidably adjusted relation.

---

This invention relates to cord extension coupling clamps, and more particularly relates to such a clamp comprising a pair of substantially rigid adjustable members for efficiency retaining an extension cord coupling connection against inadvertent separation.

There is need for a simple, inexpensive, practical device to maintain the separable elements of an extension cord coupling against inadvertent separation. Frequently the electrical cords of such equipment as vacuum cleaners, electric powered lawn mowers, hedge trimmers, industrial machinery, extension lights, and the like, must be coupled to an extension cord carrying an outlet coupling component. The inherent frictional connection between the coupling prongs or blades and the receptacle will generally not hold against anything but the most moderate separating tension.

Accordingly, it is an important object of the present invention to provide a new clamp structure for efficiently retaining extension cord couplings against separation.

Another object of the invention is to provide a novel extension cord coupling clamp comprising a pair of adjustably secured clamping members which efficiently engage and positively retain the coupling components against unintended separation.

A further object of the invention is to provide a novel extension cord coupling clamp adapted to be made from inexpensive material and comprises a rugged simple assembly readily adapted to be made by mass production methods of manufacture.

Still another object of the invention is to provide a new clamp of the character described comprising a pair of simple clamp members embodying combination reinforcing and member orienting means.

Yet another object of the invention is to provide a novel extension cord coupling clamp adapted to be made inexpensively from sheet metal stampings.

Other objects, features and advantages of the present invention will be readily apparent from the following detailed description of certain preferred embodiments thereof taken in conjunction with the accompanying drawings, in which:

FIGURE 1 is a side elevational view of an extension cord coupling and a clamp embodying features of the invention;

FIGURE 2 is a top plan view thereof;

FIGURE 3 is a vertical transverse section detail view taken substantially on the line III—III of FIGURE 1; and FIGURE 4 is a top plan view of a modified form of the clamp.

A shown in FIGURES 1 and 2, a clamp assembly 5 embodying features of the invention is constructed and arranged to engage a cord coupling connection 7 and retain it against inadvertent separation. Such a coupling includes the receptacle 8 attached to an extension cord 9 and a pronged coupling member or plug 10 operatively attached to an electrical cord 11 leading from the apparatus for which an electrical connection is desired.

In an especially economical construction, the clamp assembly 5 comprises a pair of cooperatively related clamping members 12 which, for purposes of manufacturing standardization, are desirably identical in structure and interchangeably usable in the assembly. Each of the clamp members 12 may be made from suitable gage sheet metal formed up as a stamping, or other sheet material or its equivalent. Certain high compression plastics are suitable for this purpose, and by the term "sheet material" any suitable material for the purposes is intended.

For holding the members 8 and 10 of the couplings 7 positively against unintentional separation, the clamp members 12 are constructed and related complementally to receive the coupling therebetween and to engage and, in effect, enclose the coupling in a manner to prevent its escape from the retaining engagement within the clamp. To this end, each of the clamp members 12 includes a base flange 13 of suitable length and width. While one end of the base flange is free, the opposite end, in each instance, has integrally in one piece therewith a clamping flange 14 desirably extending at right angles thereto. On its distal end, each of the clamping flanges has a relatively short retainer flange 15 extending into spaced opposed relation to the base flange 13. In assembly, the members 12 are disposed with their base flanges 13 in overlapping relation and with the clamping flanges 14 located at the opposite ends of the assembly in opposed spaced relation whereby the retainer flanges 15 project inwardly toward one another in generally enclosing relation to the space within the assembly.

For reception of the coupling 7 within the clamp 5, each of the clamping flanges 14, inclusive of its retainer flange 15 has a medial longitudinally extending electric cord clearance slot 17 through which the cords 9 and 11 respectively extend with the coupling members 8 and 10 engaged within the clamp by and between the clamping flanges 14. By having the slots 17 medially disposed, engagement of the coupling 7 is enabled without distortion from its normal coaxial alignment with the associated cords 9 and 11. This avoids any unnatural bias or stress in respect to the connections of the respective cords with their coupling members. In effect, the slots 17 substantially divide the flanges 14, 15 into respective pairs of clamping and retaining fingers.

For securing the clamp members 12 fixedly but releasably together, means conveniently comprising a bolt 18 are provided coactive with the base flanges 13. For this purpose, the bolt has its head in engagement with the innermost of the overlappingly related base flanges 13 and with the shank of the bolt propecting through matching, elongated, longitudinally extending, medially disposed, dead end slots 19 in the respective base flanges and of a width to accommodate in freely slidable engagement a square anti-turn collar 20 on the bolt with the threaded shank of the bolt extending to a substantial length beyond the outer face of the outermost of the flanges 13. Threadedly engaged on the bolt shank is a nut, preferably in the form of a wing nut 21 which, when drawn up on the bolt thrusts a thrust washer 22 against a lock washer 23 which clampingly engages the opposed base flange surface and cooperates with the bolt head in clamping the base flanges 13 frictionally into secured relation.

Means are provided for reinforcing the flanges of the clamp and for retaining the clamp members 12 in proper longitudinal orientation with respect to each other, that is, against relative swiveling motion. Efficient means for this purpose comprise longitudinally extending ribs 24 in at least the base flanges 13, but desirably extending throughout the length of the base flanges and the clamping flanges 14 as well as the retainer flanges 15 of the clamp members. In the preferred construction, each of the clamp members has two of the ribs 24 spaced respectively from the longitudinal edges and medially aligned with the finger portions of the flange 14 of the clamp member. By having a groove 25 coextensive with at least that portion of each of the ribs 24 which runs along the base flange 13, in each instance, longitudinal assembly orientation and anti-swivel interlock is provided by the engagement of the ribs 24 of one of the base flanges in the grooves 25 of the lappingly superimposed base flange. Through this arrangement, not only are the clamping members 12 efficiently reinforced against spreading distortion even though relatively thin sheet material is used in the manufacture thereof, but relative longitudinal adjustment of the clamping members is facilitated by the guiding function of the internested ribs of the base flanges, and in at least the secured condition of the clamp relative swiveling of the clamp members from proper longitudinal alignment is precluded.

When it is desired to assemble the clamp 5 with the coupling 7, the clamp members 12 are moved apart as may readily be done by slightly backing off the wing nut 21 to loosen the bolt so that the base flanges 13 may be slidably longitudinally relatively adjusted as permitted by the elongated slots 19. The coupling 7 is then engaged within the clamp with the cords 9 and 10 extending through the open ended slots 17. The dot dash position in FIGURE 1 represents the preliminary assembly condition of the clamp. To complete the clamping engagement of the coupling 7, the clamp members 12 are moved relatively toward one another into engagement with the cord ends of the coupling member 7, and the bolt 18 tightened to secure the base flanges 13, and thereby the clamp members 12 in the coupling-clamping condition. Even should the clamping securement of the clamp members 12 be relatively loose, that is with the clamping flanges 14 only lightly or even non-grippingly confronting the respective coupling members 8 and 10, escape of the coupling 7 from the clamp is effectively precluded by the base flanges 13 and the retaining fingers afforded by the clamping flanges 14 and the retainer flanges 15.

In the modification of FIGURE 4 construction and operation of the clamp 5' is substantially the same as the clamp 5 except that the base flange 13' of one of the clamp members 12' is longer than the base flange 13" of the companion clamp member 12". It will be observed that the clamp members have the respective clamping flanges 14' and 14", including the retainer flanges 15' and 15" and the open-ended cord slots 17' and 17", respectively, corresponding to the similar flanges of the clamp 5. Reinforcing and adjustment guidance and anti-swiveling ribs 24' and 24", respectively, function and cooperate in the same manner as the corresponding ribs in the clamp 5.

In the clamp 5', only the base flange 13' has an elongated closed end adjustment slot 19', while the shorter base flange 13" has the securing bolt 18' mounted in a fixed position relative thereto but longitudinally adjustably movable in the slot 19' to accommodate relative longitudinal adjustments of the clamp members 12' and 12".

It will be understood that variations and modifications may be effected without departing from the spirit and scope of the novel concept of this invention.

We claim as our invention:
1. A cord extension coupling clamp comprising:
a pair of complementary clamp members of sheet material each of which has a base flange from one end of which extends angularly a clamping flange having a terminal retainer flange projecting angularly into overlying spaced relation to the base flange;
each of said clamping flange and its retainer terminal flange having a longitudinally extending medial open ended cord-clearing slot;
said base flanges being disposed in superimposed longitudinally slidably adjustable relation with said clamping flanges in opposed relation and said retainer terminal flanges directed toward one another;
means releasably securing said base flanges and thereby said claming members in relative longitudinally adjusted relation;
and integral means projecting from one of said base flanges and interengaging with complementary means on the other of said base flanges to maintain the clamp members against relative swiveling;
whereby an electrical cord extension coupling is retainingly engageable by and between said clamping flanges within said clamp and with the coupling and the attached cords disposed without distortion of the coupling in coaxially aligned relation.

2. In a clamp according to claim 1, said interengaging means comprising at least one longitudinally extending rib on each of the base flanges providing a corresponding opposite groove and said ribs being disposed in matching such that the rib on one of the base flanges registers within the groove of the other base flange.

3. In a clamp according to claim 1, in which said interengaging means comprise respective pairs of longitudinally extending reinforcing ribs extending throughout the lengths of the clamp members and respectively spaced from their longitudinal edges and substantially medially between said longitudinal edges and said cord-clearing slots of the clamping flanges and the retainer terminal flanges, said ribs defining corresponding opposite grooves and the ribs of one of the base flanges enaging within the grooves of the other of the base flanges.

4. In a clamp according to claim 3, said cord-clearing slots dividing the clamping flanges and the retainer terminal flanges into respective pairs of fingers, said reinforcing ribs extending along the entire length of each of the fingers.

5. A clamp according to claim 1, comprising base flanges in which one of the base flanges is substantially longer than the other of said base flanges, said other of said base flanges being superimposed upon the longer base flange, said longer base flange having a central longitudinal slot substantial length therein, and said other of said base flanges having extending therethrough a retaining bolt projecting through said slot and comprising said means releasably securing said base flanges.

References Cited

UNITED STATES PATENTS

| | | | |
|---|---|---|---|
| 1,692,469 | 11/1928 | Rex | 85—50 |
| 2,473,321 | 6/1949 | Yanko | 339—75 |
| 2,761,109 | 8/1956 | Hacker | 339—75 |
| 3,029,408 | 4/1962 | Anderson | 339—75 |

MARVIN A. CHAMPION, *Primary Examiner.*

JOSEPH H. McGLYNN, *Assistant Examiner.*